United States Patent [19]

Schenker et al.

[11] Patent Number: 4,491,480

[45] Date of Patent: Jan. 1, 1985

[54] GRINDING AID AND MINERAL MIXTURE CONTAINING IT

[75] Inventors: Achim Schenker, Wiesloch; Jürgen Schutz, Waghäusel-Kirrlach; Jürgen Schneider, Wiesloch, all of Fed. Rep. of Germany

[73] Assignee: Teroson G.m.b.H., Heidelberg, Fed. Rep. of Germany

[21] Appl. No.: 558,676

[22] Filed: Dec. 6, 1983

[30] Foreign Application Priority Data

Dec. 10, 1982 [DE] Fed. Rep. of Germany ....... 3245843

[51] Int. Cl.$^3$ .............................................. C04B 7/35
[52] U.S. Cl. ...................................... 106/90; 106/102; 106/106; 106/314
[58] Field of Search ........................ 106/90, 102, 314

[56] References Cited

U.S. PATENT DOCUMENTS

| | | | |
|---|---|---|---|
| 2,225,146 | 12/1940 | Bechtold | 106/102 |
| 3,443,976 | 5/1969 | Dodson et al. | 106/102 |
| 3,459,570 | 8/1969 | Serafin | 106/102 |
| 3,607,326 | 9/1971 | Serafin | 106/102 |
| 4,204,877 | 5/1980 | Moorer et al. | 106/102 |

*Primary Examiner*—James Poer
*Attorney, Agent, or Firm*—John J. Wasatonic; William L. Baker

[57] ABSTRACT

Grinding aid for grinding pretreated or untreated minerals and mixtures of minerals, such as cement, characterized in that it consists of 1,1-dimethylol propane. Distillation first runnings from trimethylol propane production containing 1,1-dimethylol propane as the main constituent are particularly suitable. The grinding aid according to the invention leads to a considerable improvement to the flowability or fluidity of the ground material, i.e. pack-setting or compaction thereof is prevented.

14 Claims, No Drawings

GRINDING AID AND MINERAL MIXTURE CONTAINING IT

The invention relates to a grinding aid for the preparation or dressing of minerals, as well as mineral mixtures containing this grinding aid.

In the preparation of pretreated or untreated minerals, they are conventionally ground down to relatively small particles, which must take place as rapidly as possible. Grinding aids are frequently used in order to increase the grinding speed or the fineness of the particles at a given working speed. However, this can disadvantageously influence the properties of the pulverized product. Thus, e.g. through the breaking up of the particles during grinding, new energy-rich surfaces can be produced, whose surface forces remain even after the grinding process and lead to an agglomeration of the material or to poor pourability. Such effects can be so marked that, as a result of vibration such as during transportation in a hopper car, the mineral particles are compacted to such an extent that they become semisolid and cannot be poured out, unless considerable mechanical forces are used for breaking up the compact mass.

In connection with the prior art grinding aids, reference is made to German Pat. Nos. 1,220,775, 1,667,064 and 1,667,065, as well as U.S. Pat. Nos. 2,225,146, 3,183,105, 3,443,976, 3,560,230, 3,607,326, 3,615,785 and 4,204,877.

It has now surprisingly been found that the distillation first runnings obtained during 1,1,1-trimethylol propane production and in which the proportionately largest component consists of 1,1-dimethylol propane, form excellent grinding aids for grinding minerals, without having a disadvantageous influence on the pulverized product.

The subject matter of the invention is therefore grinding aids and mineral mixtures of the type characterized in the claims.

During trimethylol propane production (cf e.g. Ullmanns Encyklopädie der technischen Chemie, Vol 3, 1953, p. 298), the reaction product of n-butyl aldehyde and formaldehyde obtained through an aldol condensation is either reduced or undergoes a Cannizaro reaction, in which the aldol formed during the first reaction stage is reduced to a triol. The reaction product obtained is optionally distilled following vacuum evaporation. Distillation first runnings are obtained, which essentially consist of 1,1-dimethylol propane, $C_7$-diol, $C_8$-diol, trimethylol propane and $C_7$-monoalcohol, together with certain minor and in part unidentified constituents. Apart from the latter, a typical distillation first running obtained in trimethylol propane production contains approximately 42 to 52% by weight of 1,1-dimethylol propane, 14 to 18% by weight of $C_7$-diol, 13 to 18% by weight of $C_8$-diol, 3 to 8% by weight of 1,1,1-trimethylol propane and 3 to 6% by weight of $C_7$-monoalcohol. It is a yellowish liquid with a boiling range of approximately 230° to 300° C., a freezing point of approximately −20° C., a viscosity of approximately 285 cp and a specific gravity of approximately 1.04 g/cm$^3$.

Hitherto, there has been no suitable use for the distillation first runnings obtained during trimethylol propane production. They have hitherto been burnt as waste, which has been highly prejudicial to the environment. Thus, the present invention provides not only an excellent grinding aid, but also in part solves the waste material problems occurring during trimethylol propane production.

The pulverizing of minerals together with the grinding aid according to the invention increases the grinding efficiency, i.e. the mineral can be ground to the desired particle size at high speed. This in turn increases the mill capacity and simultaneously the energy required for grinding purposes is reduced. A further effect of the grinding aid according to the invention is an improvement to the fluidity/flowability of the ground product.

The minerals ground with the grinding aid according to the invention are naturally occurring inorganic minerals, such as phosphate rock, partly treated minerals such as concentrated iron ore and mixtures of minerals such as cement, clinker or ceramic materials. For example, the grinding aids according to the invention can be used for treating beryllium oxide, limestone, gypsum, clay and bauxite. The grinding aids according to the invention are particularly valuable in the case of cement and especially Portland cement. Portland cement is one of the hydraulic cements, which essentially consist of two calcium silicates and a smaller amount of calcium aluminate. Such cements are produced by processing an intimate mixture of a finely divided limestone, together with an argillaceous material to give a clinker, which is then ground together with approximately 2 to 5% of gypsum or some other calcium sulphate, in order to obtain the desired setting properties of the finished cement.

The grinding aids according to the invention are preferably added to the clinker, in order to increase the grinding effectiveness and prevent a subsequent caking of the finished cement.

The grinding aid quantity can vary within wide limits, but preferably 0.001 to 1% by weight and more particularly 0.01 to 0.6% by weight of grinding aid is used, based on the weight of the mineral solids. There is no upper limit for the added grinding aid quantity, but in general only that quantity required for obtaining the desired flowability and surface is added.

The grinding aids according to the invention are preferably added alone, but can also be processed together with one or more other grinding aids or other additives.

The invention is illustrated hereinafter by means of an example.

EXAMPLE

A standard cement composition consisting of 96% by weight clinker and 4% by weight gypsum is mixed with 0.4% by weight of a distillation first running from trimethylol propane production. The composition of the distillation first running is within the aforementioned composition ranges. The mixture obtained is ground in a laboratory steel ball mill after 4000 rounds. The results are given in the following table.

| Grinding aid | Blaine surface (cm$^2$/g) | "Pack-Set" index (sec) |
| --- | --- | --- |
| Blank test | 4370 | 400 |
| TMP-first runnings | 4800 | 210 |

As stated hereinbefore, on grinding, the breaking up of the mineral particles lead to new energy-rich surfaces, whose surface forces are retained even after the grinding process and lead to an agglomeration of the ground material, which in turn causes poor fluidity or flowability. This agglomeration of the particles is called "pack-setting" and is characterized by the "pack-set" index. The "pack-set" is a relative measured quantity, which numerically indicates to what extent the finely ground material is able to flow freely after a given storage time or after transportation.

The "pack-set" index is determined in the following way. Approximately 200 g of cement are introduced into a steel cylinder and compacted with a plunger under precisely defined conditions. The cement sample obtained in this way in the form of a compact cylinder is placed on a vibrating screen. The time taken for the cement sample to completely drop through the screen is determined. The measured time is called the pack-set index. The shorter the time taken for the complete breaking down of the caked cement the lower the pack-setting index, i.e. the lower the pack-setting or compaction tendency of the cement.

As is shown by the above example, the time required for passing the sample through the vibrating screen is reduced by almost 50% compared with an untreated sample on adding 0.4% by weight of a distillation first running from a trimethylol propane production process at the time of grinding. This means that cement, ground with the grinding aid according to the invention, has a much lower pack-setting or compaction tendency and consequently has better flowability characteristics than untreated cement.

What is claimed is:

1. A method comprising the step of grinding a mineral in the presence of grinding aid comprising 1,1-dimethylol propane.

2. A method of claim 1 wherein said grinding aid further comprises a $C_7$-diol, a $C_8$-diol, trimethylol propane, a $C_7$-monoalcohol, or a mixture of such.

3. A method of claim 1 wherein said grinding aid is obtained as a distillation by-product of a trimethylol propane production process.

4. A method of claim 3 wherein said grinding aid comprises 42 to 52% by weight of 1,1-dimethylol propane, 14 to 18% by weight of a $C_7$-diol, 13 to 18% by weight of a $C_8$-diol, 3 to 8% by weight of trimethylol propane, and 3 to 6% by weight of a $C_7$-monoalcohol.

5. A method of claim 1 wherein said grinding aid and is present in an amount of at least 0.001% by weight, based on the weight of said mineral.

6. A method of claim 5 wherein said grinding aid is present in an amount of 0.001 to 1% by weight, based on the weight of said mineral.

7. A method of claim 1 wherein said mineral is selected from the group consisting of beryllium oxide, limestone, gypsum, clay, bauxite, and Portland cement clinker.

8. A method comprising the step of grinding hydraulic cement clinker in the presence of a grinding aid comprising 1,1-dimethylol propane.

9. A method comprising the step of grinding Portland cement clinker in the presence of a grinding aid comprising 1,1-dimethylol propane.

10. A Portland cement composition obtained by grinding Portland cement clinker in the presence of a grinding aid comprising 1,1-dimethylol propane.

11. A composition of claim 10 wherein said grinding aid is present in an amount of at least 0.001% by weight, based on the weight of said clinker.

12. A composition of claim 10 wherein said grinding aid is obtained as a distillation by-product of a trimethylol propane production process.

13. A composition comprising Portland cement and a distillation by-product of a trimethylol propane production process, said by-product comprising 1,1-dimethylol propane.

14. A composition of claim 13 wherein said by-product is present in an amount of at least 0.001% by weight, based on the weight of said Portland cement.

* * * * *